July 26, 1960   W. D. BAILEY   2,946,156
MANUFACTURE OF A WINDOWED ARTICLE
Filed Aug. 30, 1956
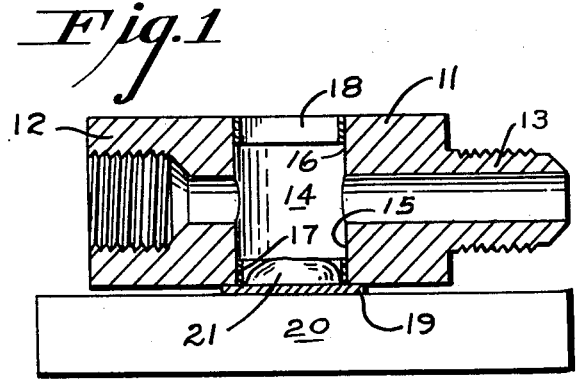
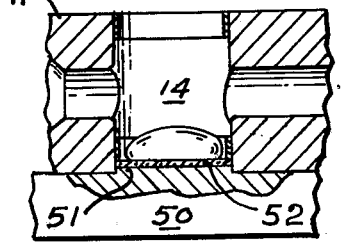
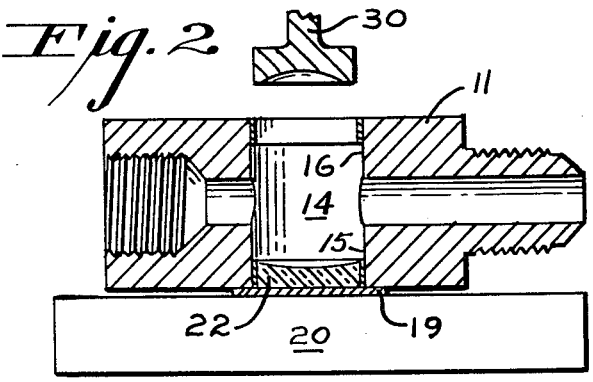
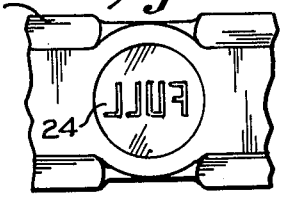
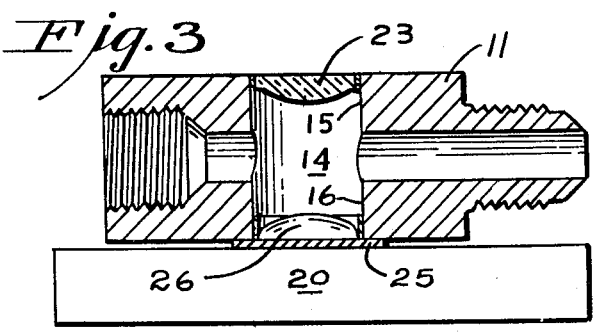
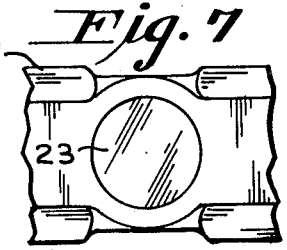
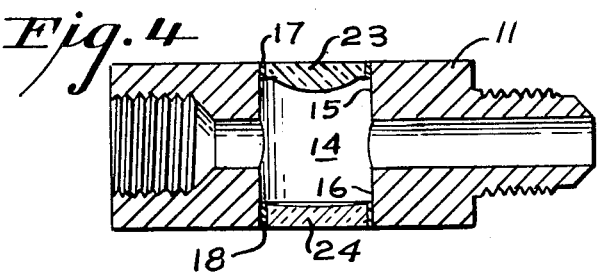
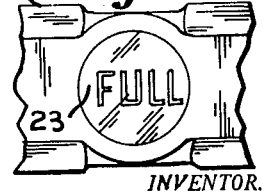
INVENTOR.
WILLIAM D. BAILEY
BY Clarence R. Patty, Jr.
ATTORNEY

United States Patent Office 2,946,156
Patented July 26, 1960

2,946,156
MANUFACTURE OF A WINDOWED ARTICLE

William D. Bailey, Corning, N.Y., assignor to Corning Glass Works, Corning, N.Y., a corporation of New York Filed Aug. 30, 1956, Ser. No. 607,190

4 Claims. (Cl. 49—81)

This invention relates to windowed metal articles, and more particularly to indicators or sight glasses used to show the presence and flow of liquid in a flow line such as is employed in a mechanical refrigeration system and to methods of their manufacture.

The refrigerants used in mechanical refrigerators operate under high pressure and usually have a low vapor pressure to be efficient for refrigeration purposes. It is important to have an indication of the presence of liquid in the refrigeration circuit to show proper operation of the system. This requires the use of a sight glass in the flow line which must be sealed therein in a fashion to withstand high pressures, and the seal must be sufficiently tight to prevent either liquid or vapor leakage, and to be unaffected by substantial changes in temperature.

Devices of this kind presently available are of a relatively expensive, complicated construction usually utilizing a glass tube joined at each end to a pipe fitting through a joint sealed with a gasket, while a metal shell encases the tube and is joined to the fittings. This shell has opposed windows through which the tube may be observed. Failure of such devices in service occurs from leakage around or deterioration of the gaskets, and the devices are frequently broken by shock or by being twisted when the fittings are coupled into or loosened from a pipe line, the metal shell being insufficient to protect the tube from twisting strains.

According to the invention such a complicated construction is avoided by an indicator that comprises a metal fitting adapted to be inserted in a fluid line and having a circular transverse passage therethrough closed by glass lenses. One such lens comprises a clear window which may have on its outer surface a designation, such as "Full" for example. The other lens may have a diffusing or image distorting inner surface, or it may simply comprise a window having a stippled or frosted inner surface to obscure vision through it when the line in which the indicator is included is empty. In any case, such lens, in the absence of liquid in the fitting, renders the designation invisible. Liquid in the fitting serves to optically unite the lenses into a single solid window irrespective of the character of their inner surfaces so that the "Full" designation may be readily read therethrough.

Also according to the invention such lenses are formed or sealed directly into the metal fitting. This is readily accomplished by first arranging a pellet of relatively hard glass in the level-viewing opening of the fitting, heating such glass and the surrounding fitting until the glass becomes molten and flows into sealing relation with the surrounding surfaces of the fitting and then pressing such molten glass to the desired lens pattern or contour between a flat exterior supporting surface and a lens shaping plunger that is passed through the oppositely disposed opening in the fitting.

The lens to carry the designation is formed and sealed in the fitting by placing a pellet of relatively soft glass in the remaining end of the fitting, as by placing such fitting over a pellet of glass arranged on a suitable support and passing them through an atmosphere heated to a temperature suitable to cause such glass to melt and form a lens that conforms to the surface of the support and to seal the border of such lens to the fitting, but at a temperature below that at which the pressed lens would become deformed.

In order to obtain seals between the fitting and the lenses that are leak proof at high pressures, applicant prefers to apply an enamel frit to the sealing surfaces of the fitting before sealing the lenses therein. Also to improve the impact strength and resistance to abrasion of the exterior surfaces of the lenses they are preferably veneered or cased with thin sheets or layers of glass of lower expansion than those of the lenses. This may be accomplished by uniting thin sheets or layers of suitable glass compositions with the lenses during their formation. Such sheets are preferably approximately .002" in thickness although this dimension is not critical.

For a better understanding of the invention preferred embodiments thereof are herein shown and described.

In the accompanying drawing Fig. 1 is a sectional view in the side elevation of the metal part or fitting of a fluid indicator embodying the preferred form of the invention, shown resting on a sheet of mica or glass arranged on a suitable support and with a pellet of glass to be sealed therein occupying the lower end of a transverse passage through such fitting.

Fig. 2 is a view similar to Fig. 1, with the glass illustrated in a molten state and with a forming plunger, shown in sectional elevation, arranged thereover.

Fig. 3 is a view showing the fitting inverted with respect to the showing of Fig. 2, with a lens in the form to which it has been pressed by the plunger of Fig. 2, and with a pellet of glass occupying the side opening in the fitting opposite that occupied by the pressed lens.

Fig. 4 is a view similar to that of Fig. 3, showing the appearance of the fitting after the second introduced pellet has been merely molten to form a lens in the side opening occupied by it.

Fig. 5 is a view similar to Fig. 1, but showing the support partly in section and as having a raised portion of substantially the passage diameter projected into the lower end of the transverse passage and a thin circular sheet of mica or glass arranged on such raised portion.

Fig. 6 is a rear view, in elevation, of a fragment of a completed indicator embodying the invention.

Figs. 7 and 8 respectively are similar front views of the indicator illustrating its appearance when empty and full of fluid respectively.

Referring to the drawing in detail the number 11 designates a metal fitting, preferably of brass, having internally and externally threaded ends 12 and 13 respectively and having a transverse passage 14 therethrough with oppositely disposed side openings. The opening surrounded by wall surface 15 is closed by a pressed planoconvex lens or bulls eye 23, whereas the opening surrounded by wall surface 16 is closed by a plano-concave lens 24 having the designation "Full" placed backwards on its exterior surface, as illustrated in Fig. 6.

In the manufacture of the indicator as shown in Figs. 1 through 5 the fitting wall surfaces 15 and 16 to be occupied by lenses are given glass frit coatings 17 and 18. After such coatings have been allowed to dry the fitting is placed on a refractory support 20 with a thin sheet 19 of mica or glass arranged between it and the fitting, as shown in Fig. 1. A pellet of hard glass 21 is next deposited on the sheet 19 and the assembly heated until the pellet becomes a molten body 22, as illustrated in Fig. 2. A plunger 30 is then brought into pressing relation with the body 22 to form it into a pressed lens such as 23.

A thin sheet 25 of mica or glass is next arranged on a support such as 20 and a pellet of soft glass 26 arranged thereon and the fitting arranged thereover, as illustrated in Fig. 3, and heated sufficiently to melt the pellet 26 into the plano-concave lens 24, as illustrated in Fig. 4.

If sheets of mica are employed in the foregoing operations they merely serve as a parting material and whether or not they are needed depends upon the character and surface finish of support available.

If the lenses are to be glass cased, sheets of glass are employed in lieu of mica. The glass sheets do not stick to the support since the temperatures at which the lenses are formed are slightly below the melting temperatures of the glasses of such sheets, but near enough thereto that invisible unions between the sheets and the molten glass are effected.

If the lenses have been cased with sheets of glass, the excess glass of the sheets bordering the passage, cool at a greater rate than the portions thereof in union with the lenses and thermal stresses are thus produced in such excess glass causing it to break away from the lenses along their border regions.

It may in some instances be preferable to locate the lenses with their exterior surfaces slightly inward from the outward ends of the passage. This variation of arrangement can be produced by use of a support 50 (Fig. 5) having a slightly raised region 51 adapted to occupy the entrance of the fitting passage. A circular sheet of mica or glass 52 of the passage diameter is under these circumstances arranged on the raised region 51 of support 50 within the passage in lieu of a sheet such as 19 or 25, depending upon whether or not it is desired to case the lens, and the method otherwise carried out substantially as already described.

In any case after a fitting has suitably cooled to below the strain temperature of the softest glass used, it is removed from the support and a label such as the word "Full" applied backwards on the outer surface of the lens, such as 24, to complete the indicator.

A wide choice of glass compositions may be utilized provided that they will soften sufficiently to form a hermetic seal at temperatures which will not objectionably affect the metal fitting and that one of the glasses is substantially softer than the other. The thin glass sheet must in any instance, of course, have a somewhat lower expansion characteristic than that of the associated lens glass.

By way of example, a suitable hard glass is composed of 40% $SiO_2$, 50% PbO, 6.3% $K_2O$, 2.7% $Na_2O$, and 1% $Li_2O$; and a suitable soft glass is composed of 3% $SiO_2$, 75% PbO, 11% $B_2O_3$, and 11% $Al_2O_3$. The frit coatings 17 and 18 are preferably composed of equal parts by volume of each lens glass pulverized and mixed with a vehicle such as nitrocellulose 23 g. dissolved in 100 ml. of amyl acetate. Casing glass sheets suitable for use with the respective above compositions may be composed of 80% $SiO_2$, 13.5% $B_2O_3$, 4.5% $Na_2O$, 2.0% $Al_2O_3$ and of 65% $SiO_2$, 8% $B_2O_3$, 7% $Na_2O$, 7% $K_2O$, 2% $Al_2O_3$, 7% ZnO, and 4% $TiO_2$ respectively.

What is claimed is:

1. The method of providing a metal fitting passage, oppositely disposed from a windowed passage in such fitting, with a window, which includes closing one end of the passage by supporting the fitting on a surface thereof that closes the one end of such passage and supports the fitting on the portions thereof bordering such passage end; placing a pellet of glass, having a melting temperature below that in the existing window, in the fitting passage at its closed end and heating such supporting surface, fitting and pellet until the pellet is melted into a pool which when cooled comprises a window laterally confined by the surrounding passage bordering surface, and subsequently cooling the fitting to a temperature below the strain point of the glass.

2. A method such as defined by claim 1 which includes placing a thin sheet of a somewhat lower expansion glass between the support and pellet of a size that extends beyond the border of the passage whereby it unites with the glass of the window to case it and effecting the removal of that portion of the sheet extending outside such border by its fracture along such border by stresses introduced therein as the fitting cools to below the strain point temperature of the glass of the window.

3. The method of providing a metal fitting passage with a window, which includes closing one end of the passage by supporting the fitting on a surface thereof that closes the one end of such passage and supports the fitting on portions thereof bordering such passage end, placing a thin sheet of glass between the support and fitting of a size that extends beyond the border of such passage, arranging a pellet of glass of a relatively higher expansion than that of the sheet thereon in the fitting passage, heating the supporting surface, fitting, glass pellet and sheet until the pellet is melted into a pool and unites with the region of the sheet thereunder while being laterally confined by the passage bordering portion of the fitting, and subsequently cooling the fitting to a temperature below the strain point of the glass to effect severance of the portion of such sheet projecting beyond the border of the window from the portion thereof embodied in such window.

4. A method such as defined by claim 1 which includes closing the passage by placing a thin sheet of a somewhat lower expansion glass between the support and pellet whereby the portion of such sheet opposite such passage unites with the glass of the window to case it and utilizing stresses introduced into such sheet as the fitting cools to below the strain point temperature of the glass of the window to effect severance of that portion of the sheet extending beyond such passage from the cased window.

References Cited in the file of this patent

UNITED STATES PATENTS

| | | |
|---|---|---|
| 706,863 | Shaffer | Aug. 12, 1902 |
| 732,812 | Anderson | July 7, 1903 |
| 756,971 | Leighton | Apr. 12, 1904 |
| 2,015,484 | Lilienfeld | Sept. 24, 1935 |
| 2,194,886 | Dallenbach | Mar. 26, 1940 |
| 2,219,573 | Fraenckel | Oct. 29, 1940 |
| 2,345,278 | Monack | Mar. 28, 1944 |
| 2,362,505 | Smith | Nov. 14, 1944 |
| 2,399,275 | Wenk | Apr. 30, 1946 |
| 2,549,504 | Messana | Apr. 17, 1951 |
| 2,600,148 | Wittlin | June 10, 1952 |
| 2,603,915 | Lysak | July 22, 1952 |
| 2,629,093 | Pask et al. | Feb. 17, 1953 |
| 2,655,124 | Gary | Oct. 13, 1953 |
| 2,714,868 | Franck | Aug. 9, 1955 |
| 2,744,487 | Moore | May 8, 1956 |
| 2,784,532 | Griffiths | Mar. 12, 1957 |
| 2,786,307 | Pither | Mar. 26, 1957 |